US012106739B2

(12) United States Patent
Wonser

(10) Patent No.: US 12,106,739 B2
(45) Date of Patent: Oct. 1, 2024

(54) MANUAL MUSIC GENERATOR

(71) Applicant: Parker J. Wonser, Alto, MI (US)

(72) Inventor: Parker J. Wonser, Alto, MI (US)

(73) Assignee: Parker J Wosner, Alto, MI (US)

( * ) Notice: Subject to any disclaimer, the term of this patent is extended or adjusted under 35 U.S.C. 154(b) by 574 days.

(21) Appl. No.: 17/326,574

(22) Filed: May 21, 2021

(65) Prior Publication Data

US 2021/0366448 A1 Nov. 25, 2021

Related U.S. Application Data

(60) Provisional application No. 63/028,121, filed on May 21, 2020.

(51) Int. Cl.

| | |
|---|---|
| ***G10H 1/00*** | (2006.01) |
| ***G10H 1/18*** | (2006.01) |
| ***G10H 3/10*** | (2006.01) |
| ***G10H 7/00*** | (2006.01) |
| ***H04R 1/02*** | (2006.01) |
| ***H04R 1/10*** | (2006.01) |

(52) U.S. Cl.

CPC ............. *G10H 1/0008* (2013.01); *G10H 1/18* (2013.01); *G10H 3/10* (2013.01); *G10H 7/008* (2013.01); *H04R 1/025* (2013.01); *H04R 1/10* (2013.01); *G10H 2220/171* (2013.01); *G10H 2240/161* (2013.01); *H04R 2460/13* (2013.01)

(58) Field of Classification Search

CPC .......... G10H 1/0008; G10H 1/18; G10H 3/10; G10H 7/008; G10H 2220/171; G10H 2240/161; H04R 1/025; H04R 1/10; H04R 2261/13; H04R 2260/13

USPC ............................................................ 84/609

See application file for complete search history.

(56) References Cited

U.S. PATENT DOCUMENTS

| | | | | | |
|---|---|---|---|---|---|
| 4,470,334 | A * | 9/1984 | Barlow | G10H 1/32 | 84/649 |
| 5,920,024 | A * | 7/1999 | Moore | G10H 1/00 | 356/28 |
| 7,230,175 | B2 * | 6/2007 | Whiteside | G10H 1/342 | 84/465 |
| 7,842,879 | B1 * | 11/2010 | Carter | G10H 3/143 | 84/730 |
| 8,497,760 | B2 * | 7/2013 | Whalen | G10H 1/0066 | 340/4.1 |
| 2005/0207599 | A1 * | 9/2005 | Fukumoto | G06F 3/014 | 381/151 |

(Continued)

FOREIGN PATENT DOCUMENTS

| | | | | |
|---|---|---|---|---|
| CN | 102483649 B | * | 5/2015 | B06B 1/06 |
| CN | 105741639 A | * | 7/2016 | |

(Continued)

*Primary Examiner* — Christina M Schreiber

(74) *Attorney, Agent, or Firm* — Adam K. Sacharoff; Much Shelist, P.C.

(57) ABSTRACT

A manual music generator designed to help musicians express and capture their musical inspiration while on the go. The quick two step music composition process empowers all levels of musicians to accurately record their musical inspiration before the idea exits their imagination. The apparatus breaks down the musical expression process into two steps by separating pitch and rhythm, enabling musicians to easily express and record the musical riffs in their head.

20 Claims, 10 Drawing Sheets

(56) References Cited

U.S. PATENT DOCUMENTS

| | | | | |
|---|---|---|---|---|
| 2006/0230913 A1* | 10/2006 | Liao | G10H 1/32 | 84/744 |
| 2007/0012167 A1* | 1/2007 | Bang | G10H 1/0008 | 84/723 |
| 2008/0156180 A1* | 7/2008 | Bagale | G10H 1/40 | 84/743 |
| 2010/0294112 A1* | 11/2010 | Asakura | G10H 1/368 | 84/613 |
| 2011/0209599 A1* | 9/2011 | Aponte | G10H 1/0008 | 84/723 |
| 2011/0316784 A1* | 12/2011 | Bisutti | G06F 1/1626 | 345/168 |
| 2013/0180384 A1* | 7/2013 | Van Wagoner | G09B 15/06 | 84/485 R |
| 2014/0202316 A1* | 7/2014 | Szalay | G10H 1/0066 | 84/645 |
| 2015/0206521 A1* | 7/2015 | Sexton | G10H 3/146 | 84/609 |
| 2017/0270904 A1* | 9/2017 | Suitor | G10H 1/0083 | |
| 2017/0295269 A1* | 10/2017 | Hosoi | H04R 1/1008 | |
| 2020/0279544 A1* | 9/2020 | Katz | G10H 1/02 | |
| 2021/0248986 A1* | 8/2021 | Piccionelli | G10H 1/0083 | |
| 2021/0366448 A1* | 11/2021 | Wonser | G10H 1/0555 | |
| 2021/0407474 A1* | 12/2021 | Sato | G10H 1/46 | |
| 2022/0208160 A1* | 6/2022 | Marticorena | G10H 1/0008 | |
| 2022/0246121 A1* | 8/2022 | Zhong | H04R 1/025 | |
| 2023/0178056 A1* | 6/2023 | Schulze | G10H 1/0008 | 84/645 |

FOREIGN PATENT DOCUMENTS

| | | | | |
|---|---|---|---|---|
| DE | 102004053072 A1 * | 5/2006 | G10H 1/0008 |
| DE | 202012009088 U1 * | 1/2013 | G10H 1/0008 |
| FR | 2986162 A1 * | 8/2013 | A63H 5/00 |
| GB | 2526278 A * | 11/2015 | G10H 1/0008 |
| JP | 2005327252 A * | 11/2005 | G06F 3/03548 |
| JP | 4811046 B2 * | 11/2011 | G11B 27/105 |
| JP | 6971130 B2 * | 11/2021 | |
| KR | 200337507 Y1 * | 12/2003 | |
| WO | WO-2010089560 A1 * | 8/2010 | G06F 3/0338 |
| WO | WO-2015194423 A1 * | 12/2015 | G10G 1/00 |

* cited by examiner

MANUAL MUSIC GENERATOR

CROSS REFERENCE TO RELATED APPLICATIONS

This application is a nonprovisional of U.S. Provisional Application 63/028,121 filed May 21, 2020, incorporated by reference.

FIELD OF THE INVENTION

The present invention relates generally to a manual music generator apparatus and process.

BACKGROUND OF THE INVENTION

Various types of existing electronic music generating devices are becoming increasingly popular with people who want to better find, explore and capture their musical thoughts. Musical thoughts frequently come and go in a matter of moments at random times and locations. Due to the illusive nature of musical ideas, speed of use, portability, and conduciveness to use in a wide variety of environments are often desirable traits for electronic music generating devices when capturing these musical ideas. To satisfy consumer demand for a quick, portable, and environmentally conducive music capturing device, manufacturers are continually striving for a wide variety of devices for consumers. It would therefore be desirable to be able to provide an electronic music generating device by accomplishing one or more goals through one or more of the embodiments discussed herein.

SUMMARY OF THE INVENTION

In a first aspect, the invention features a manual music generator apparatus. A housing is configured for a manual manipulation of a user's hand, the housing having a body. A microprocessor has one or more processors and a memory. The memory has programs, and a plurality of prestored musical instrument sounds. An instrument switch is in communication with the microprocessor, the microprocessor being configured to change musical instrument sounds within the plurality of prestored musical instrument sounds to a selected musical instrument sound when the instrument switch is pressed. An electrically conductive surface is positioned along a portion of the housing and configured for access by a user's finger. An electrical sensor is positioned in the housing and in communication with the electrically conductive surface and microprocessor. The electrical sensor is configured to sense an intensity level of an electrical characteristic, such as current, voltage, potential, resistance, or resistivity. At the electrically conductive surface as a user's finger slides up and down the electrically conductive surface. The microprocessor's programs are programmed to adjust the pitch of the selected musical instrument sound to create a musical tone as a user's finger slides back and forth along the electrically conductive surface. A trigger switch is in communication with the microprocessor and accessible from an external area of the housing, the trigger switch when pressed stores the musical tone, to permit multiple musical tones to be stored one after another. A pickup is positioned in the housing and in communication with the electrically conductive surface and microprocessor, the pickup configured to sense a vibration of the electrically conductive surface when the electrically conductive surface is tapped by a user's finger, such that when the electrically conductive surface is tapped multiple times corresponding to the multiple musical tones and tapped in a rhythm, the microprocessor stores the rhythm with the multiple musical tones to create a sequence of musical notes. An audio delivery device is in communication with the microprocessor and configured to play sounds generated by the apparatus.

Embodiments of the invention may incorporate one or more of the following features or advantages. The audio delivery device may be a bone conduction speaker positioned in the housing adjacent to the bone conduction surface in communication with the microprocessor and configured to play sounds generated by the apparatus as sound vibrations. The audio delivery device may be a pair of headphones plugged into a headphone input that is in communication with the microprocessor. The electrically conductive surface may be an electrically conductive string stretched across a notch defined along a portion of the housing, and wherein the microprocessor is configured to detect a user's finger sliding across the electrically conductive string and further configured to detect a user's finger plucking the electrically conductive string. The electrically conductive surface may be a tactile surface positioned along a portion of the housing. The microprocessor may be configured to playback the sequence of musical notes by an activation of the trigger switch. A rotary switch actuator may be positioned within a circular bore defined by the housing, the rotary switch actuator in communication with the microprocessor having multiple rotatable positions, each position of the rotatable positions being configured to access a corresponding electronic folder stored on the microprocessor for storing data. Data stored in the corresponding electronic folder may include a previously saved sequence of musical notes. A rechargeable battery may be configured to supply power to the apparatus. A port access in communication with the microprocessor may be configured to provide power and data transfer.

In general, in a second aspect, the invention features a process of generating a sequence of music notes. A musical instrument sound is selected from a plurality of musical instrument sounds prestored in a memory from a microprocessor also having one or more processors. An electrically conductive surface is provided in communication with the microprocessor. A musical tone of the musical instrument sound is selected by adjusting the pitch of the selected musical instrument sound from sliding a user's finger up and down the electrically conductive surface. The musical tone is stored in the microprocessor's memory. Musical tones are repeatedly selected and stored to create a plurality of musical tones stored one after each other on the microprocessor's memory. The multiple musical tones are replayed one at a time by actuating the electrically conductive surface. An intensity of vibration is sensed against the electrically conductive surface during the actuation of the electrically conductive surface as a rhythm and storing the rhythm with the multiple musical tones to create a sequence of musical notes.

Numerous other advantages and features of the invention will become readily apparent from the following detailed description of the invention and the embodiments thereof, from the claims, and from the accompanying drawings.

BRIEF DESCRIPTION OF THE FIGURES

A fuller understanding of the foregoing may be had by reference to the accompanying drawings, wherein.

DETAILED DESCRIPTION OF THE INVENTION

Figure 1:
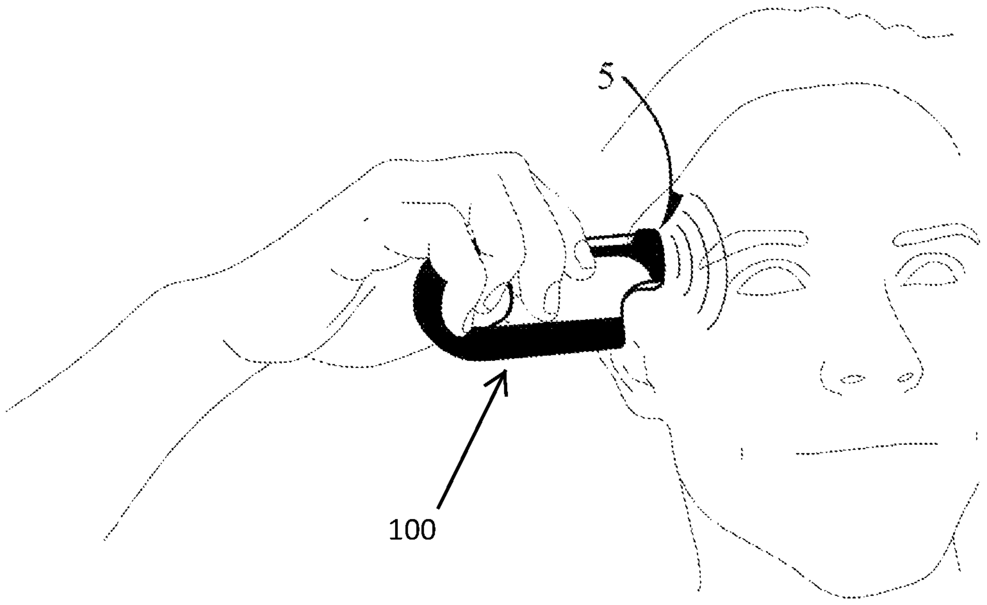
FIG. 1 is an illustration of a user holding a manual music generator to their head and using a bone conductor to listen to musical notes.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention or the embodiments illustrated.

Manual music generator 100 may be a pocket-able electronic music tool designed to help musicians express and capture their musical inspiration while on the go. The quick and easy two step music composition process may assist musicians to accurately record their musical inspiration before the idea exits their imagination. Music is mentally challenging to execute because of the many elements simultaneously happening. Some of these elements include pitch, tempo, timbre, rhythm, structure, duration, and dynamics. The manual music generator 100 may break down the musical expression process into two steps by separating pitch and rhythm, enabling musicians to easily express and record the musical riffs in their head. Since the manual music generator 100 may remove the need to mentally balance many music elements simultaneously while playing, it may render music creating much more doable and quicker now that the musician may only need to focus on pitch first and then adding rhythm later.

Referring now to the figures, a user may place manual music generator 100 in contact with a bone conduction speaker surface 14 against the skin, such as the temporal or mastoid bone near the ear so that the exported audio vibrations can successfully transfer into the ear canal, as illustrated in FIG. 1. The bone conduction speaker surface 14 is a wireless and tangle free method of delivering audio thus creating a quicker music capturing experience. Delivering audio through the bone conduction speaker surface 14 may be largely silent to bystanders which could help the user discretely compose music in a myriad of quiet environments like bathrooms or libraries without disturbing others.

Figure 2:
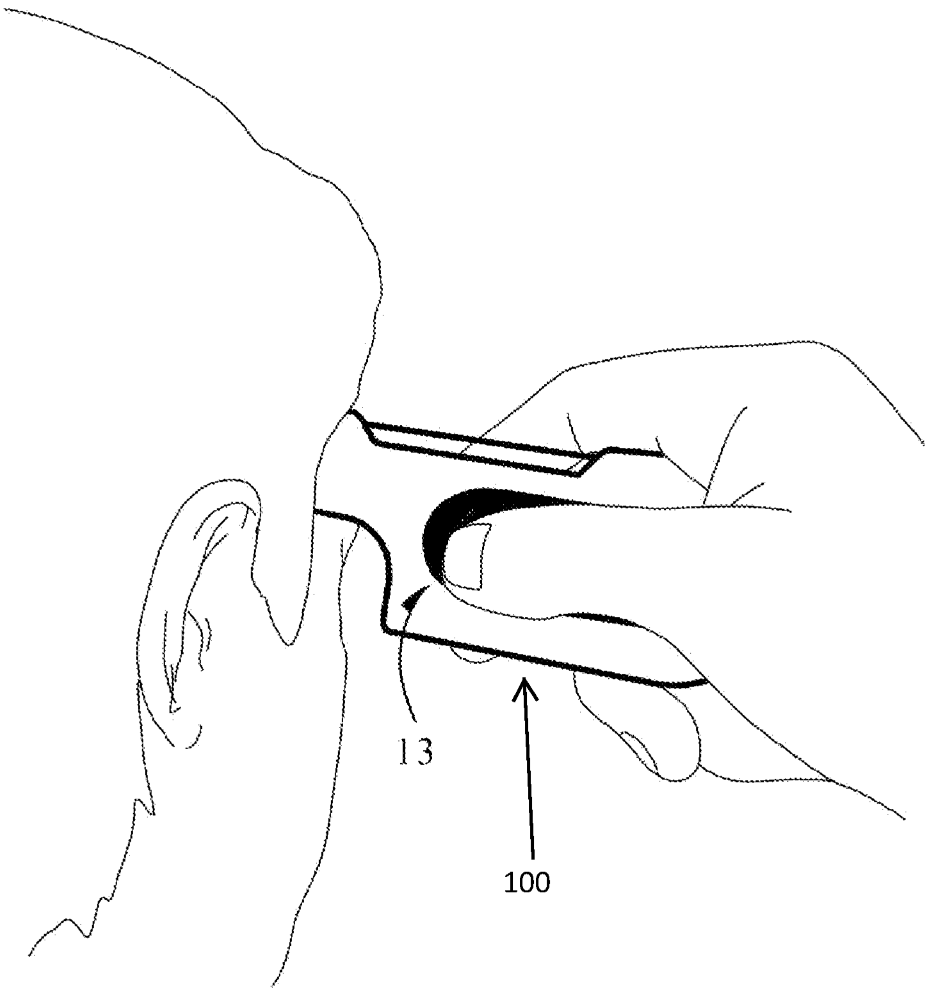
FIG. 2 is an illustration of a user holding a manual music generator to their head and selecting a musical instrument sound.

The user may press the "switch instrument" button 13 to cycle through instrument sounds pre-recorded on the manual music generator 100. The user may cycle until they settle or select an instrument sound they would like to use to play the musical riff they have in their imagination, FIG. 2.

Instrument sounds may be preloaded onto manual music generator 100 or even updated/uploaded into manual music generator 100 by connecting manual music generator 100 to a computer or server (as discussed herein below).

Figure 3:
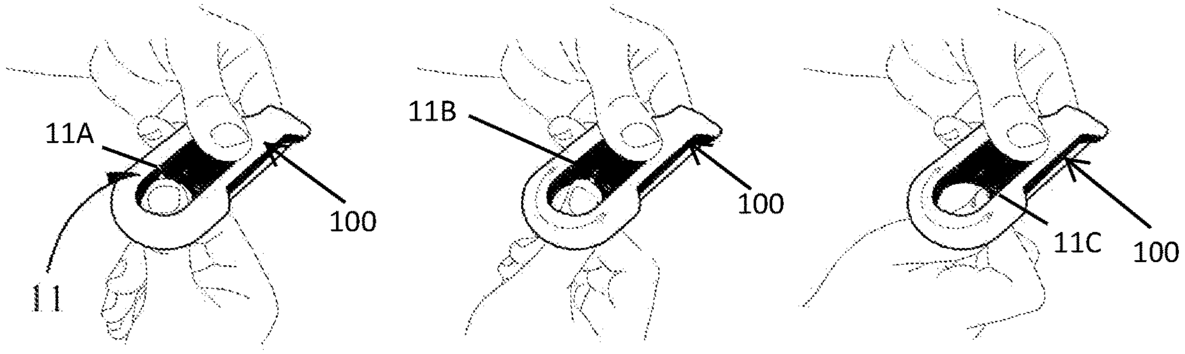
FIG. 3 is an illustration of a user selecting a file location.

As shown in FIG. 3, the rotary switch 11 may be set to one of many folders by rotating the indicator bump to align with the preferred destinations or indicators (11A, 11B, 11C). This may help the user organize their recorded riffs. Whichever folder they select may be where the following recording will be saved.

Figure 4:
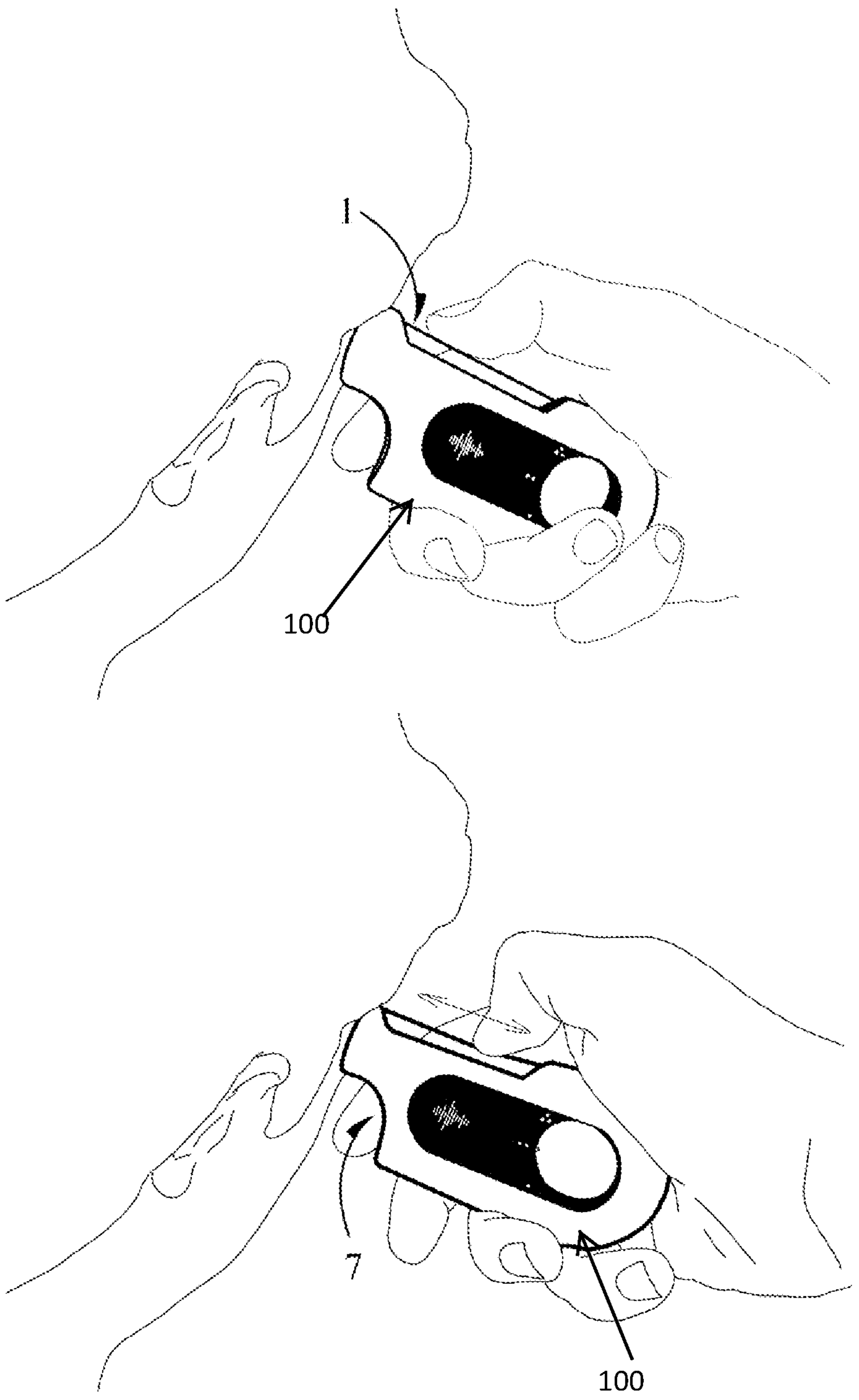
FIG. 4 is an illustration of a user holding a manual music generator to their head and sliding their figure around the string to select a note.

Step one: The first set of actions may be to find the note pitches in the sequence the user is thinking of. By scrolling a finger up and down the string 1, like moving up and down a piano, the user may hear the pitch change of the note. When the user scrolls their finger higher on the string, a higher note may be played. When the user scrolls their finger in the opposite direction, a lower note may be played. When a finger scrolls either direction on the string 1 in search for notes, the audibly previewed notes may play in a chromatic scale playing a proportional number of notes to the distance scrolled with the finger. Once the user finds the desired note, they press the "add note" button 7 which logs that note's pitch as the first in its sequence. The user can then search for the second note by scrolling up and down the string 1 again and presses the "add note" button 7 when the second note has been found, illustrated in FIG. 4. The user may repeat this process until all the desired notes have been plugged and saved into a musical note sequence.

Figure 5:
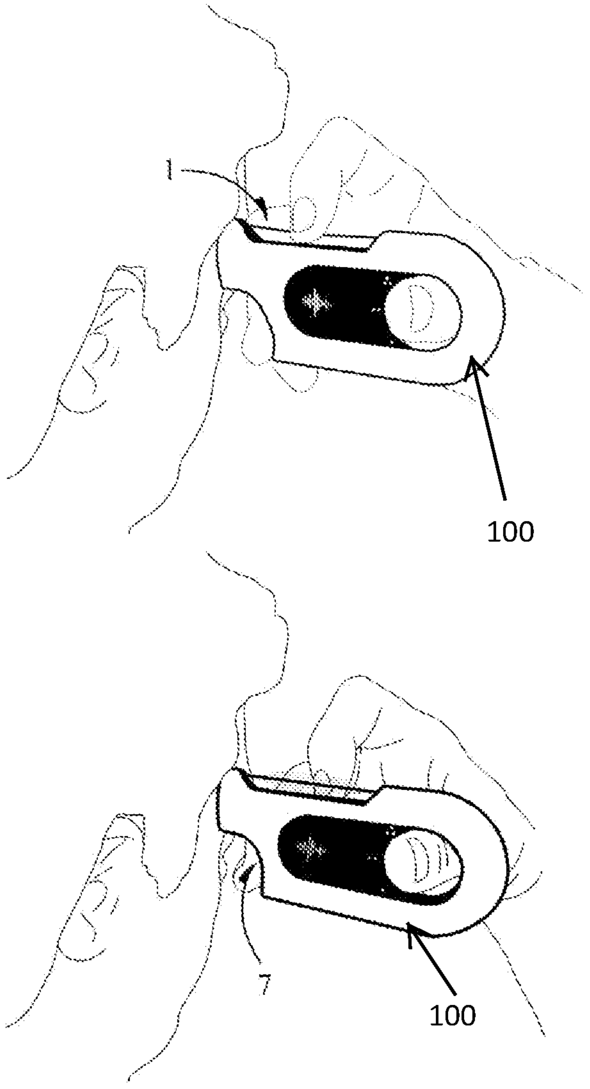
FIG. 5 is an illustration of a user holding a manual music generator to their head and plucking the string to add rhythm.

Step two: The user currently has a musical note sequence without rhythm. The user may now take the musical note sequence and add rhythm by specifying when each note should be played. When the user plucks the string 1, like a harp string, the first note may be audibly played from the sequence through the bone conduction speaker 5. The user may pluck the string 1 again and the second note in the sequence may be audibly heard. The user may continue plucking the string 1 at any desired rhythm in order to match the tune they had in their head only a few moments before. Once they create the desired rhythm, they may record and save the riff by holding down the "add note" button 7 and plucking the string to play back the sequence at the desired rhythm, illustrated in FIG. 5. Once the add note button 7 is released the user may hold down the "switch instrument" button 13 for a long hold (one or two seconds) to activate a playback to listen to their previously recorded melodies. The process of the manual music generator 100 may be easily learned by musicians because the creation process is extremely tactile and familiar to those who have played analog instruments. The manual music generator 100 is small and can fit in most pockets which may give users versatility to carry the manual music generator 100 on their person daily to quickly capture musical inspiration wherever it strikes before the idea exits their imagination.

It may be further possible to double click the add note button 7 to add a new note to the last saved note in order to create a chord. The double click on the add note button 7 could be done multiple times to create chords made up of two, three, or even more notes together.

It may further be possible to change one or more of the note's pitch once the musical note sequence is saved, even after the rhythm is added. Also, depending on the user, it may be possible to create the rhythm first and then select the pitch of each note.

Figure 6:
FIG. 6 is an illustration of a manual music generator connected to a computer.

If the user would like to offload their recorded musical riffs, the user may be able to connect manual music generator 100 to a computer or mobile device. The connection can be wireless or wired, such as with the use of a transmitter or a cable. As shown in FIG. 6, a cable connects the port 9 and connects it to a computer to save a digital audio file. As noted above, connected manual music generator 100 to a computer may further allow the user to update and download instrument sounds.

Figure 7:
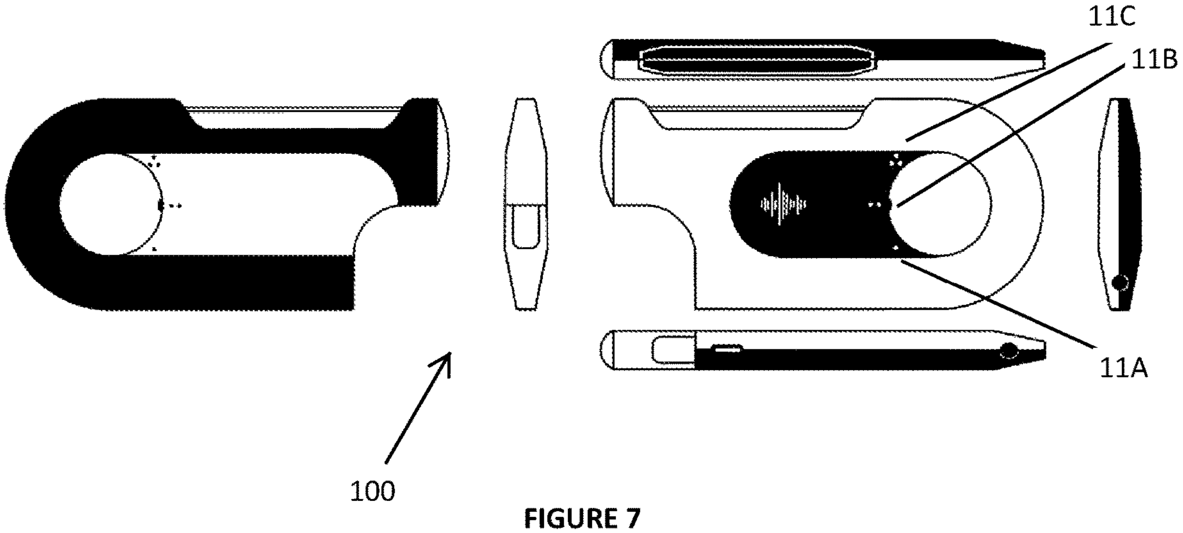
FIG. 7 are plan view illustrations of a manual music generator.
Figure 8:
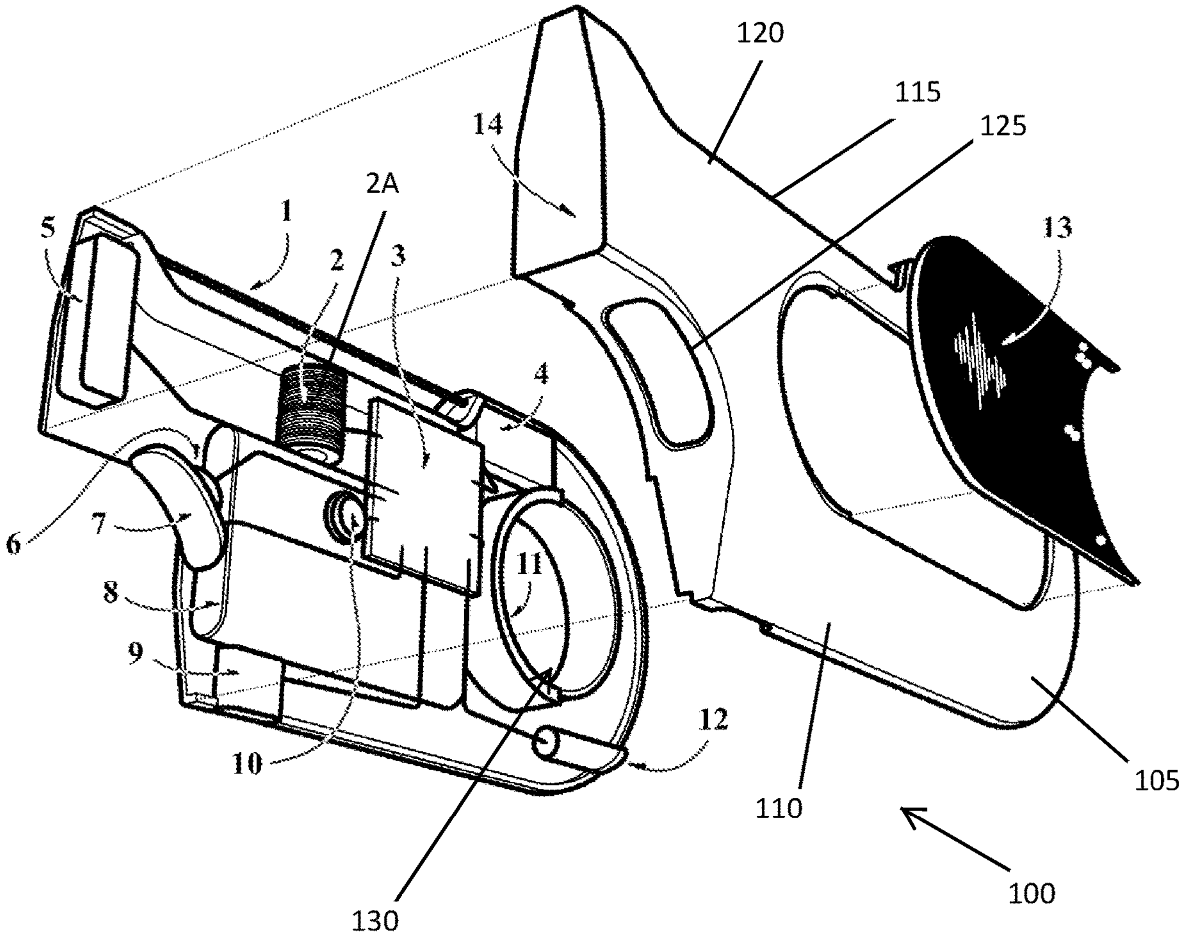
FIG. 8 is a view of a manual music generator.
Figure 9:
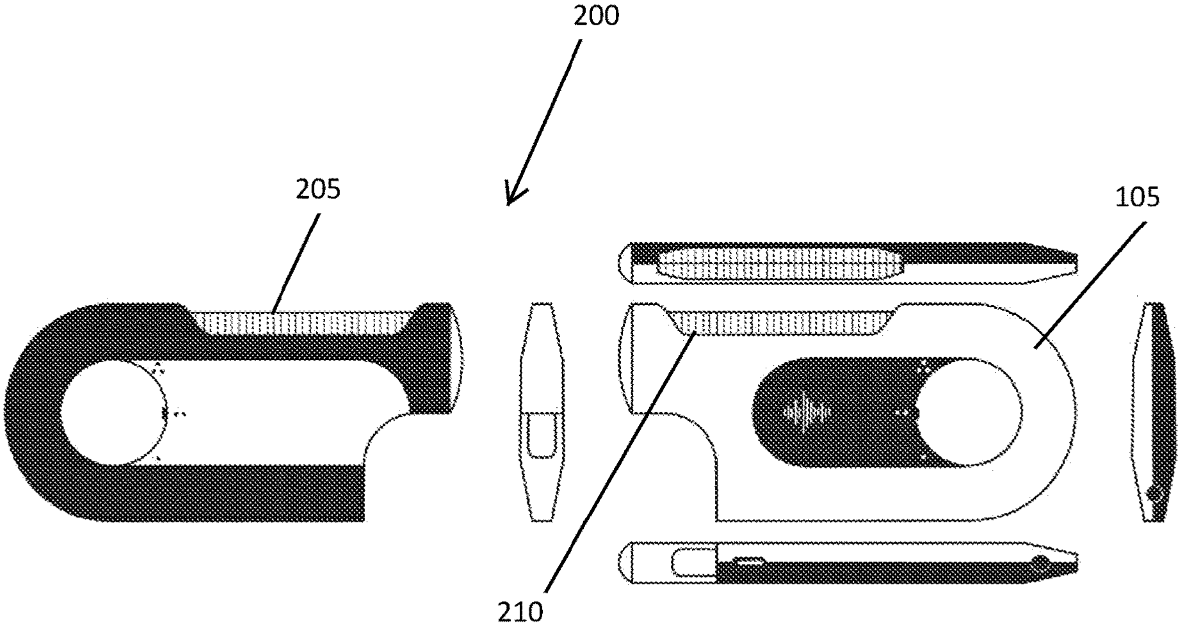
FIG. 9 are plan view illustrations of a manual music generator incorporating a tactile surface instead of a string.
Figure 10:
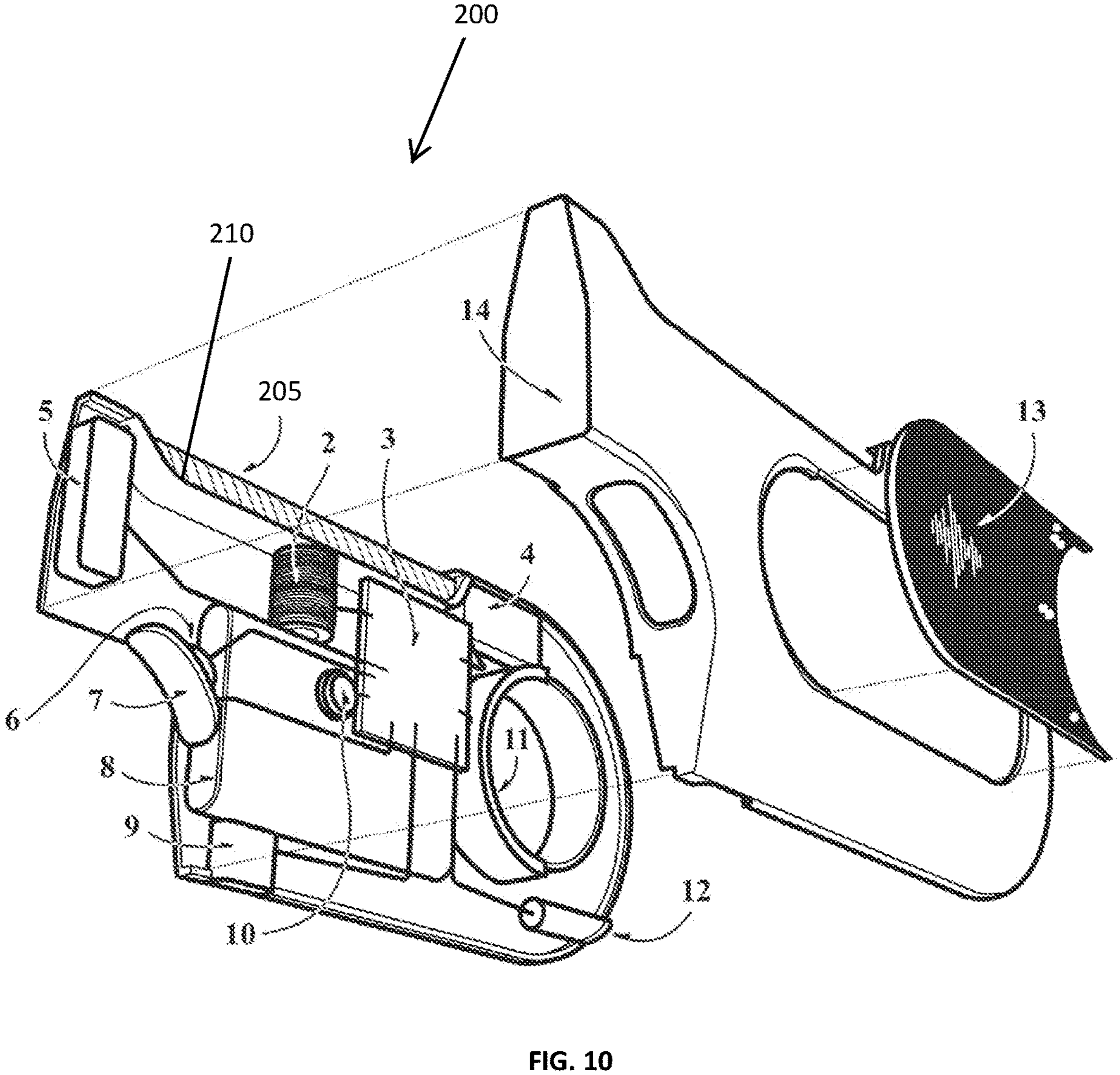
FIG. 10 is a view of the components of a manual music generator incorporating a tactile surface instead of a string.

FIG. 7 shows a planar view of manual music generator 100, and FIG. 8 shows an exploded view.

As detailed in FIG. 8, the element components and reference numbers are further outlined by the following disclosure:

(a) String 1 may be made of an electrically conductive material. Although this string input method may change to a different type of input.

(b) Magnet 2 may be wrapped in a copper coil 2A and which communicates to the microprocessor 3 when and how hard the string 1 is plucked by reading the vibration of the string through the disruption of the magnet's electronic field. It acts identically to an electric guitar string pickup.

(c) Microprocessor 3 may be the brain of the machine and also stores the data of recorded tunes into folders.

(d) a electrical sensor 4, measuring electrical properties of the string 1 and reading how it changes as the finger slides up and down, could be viewed as an analog to digital converter that interpolates a signal passing through the wire that is interrupted by contact at certain locations.

(e) Bone conduction speaker 5 outputs the primary audio for manual music generator 100.

(f) Button switch actuator 6 for Add Note Button 7 that communicates with the microprocessor 3.

(g) "Add note" button 7 to be pressed when adding notes to a musical note sequence in step one. This same button may also be used in step two to record sequences while playing by holding down the button for the duration of the time the user would like to record.

(h) Rechargeable battery 8 that supplies power to manual music generator 100.

(i) Port Access 9 used for charging the battery as well as offloading musical recordings to other devices. This method of exporting recordings has potential to be replaced by wireless data transfer.

(j) Button switch actuator 10 for Switch Instrument Button 13.

(k) Rotary switch actuator 11 for the user to select one of many (locations 11A, 11B, 11C) on the Switch Instrument Button 13 to designate folders they would like to save their recorded musical riff into for easy organization.

(l) Auxiliary input jack 12 acts as a secondary alternative audio output method if the user wishes to use headphones instead of the bone conduction speaker (part 5).

(m) "Switch instrument" button 13 may be pressed when the user wishes to cycle through different instrument sounds.

(n) This bone conduction speaker surface 14 may be placed against the user's skin over their temporal bone near the ear in order to transfer the audio output into the user's ear canal. The surface acts as a medium to carry vibrations sent from the bone conduction speaker (part 5) into the ear.

In one aspect of the manual music generator there is provided a manual music generator apparatus 100. The apparatus 100 may include a housing 105, typically a two-piece housing, configured to be held by a user's hand. The housing 105 has a body 110 and a notch 115 carved along the top portion 120 of the housing 105. The apparatus also includes a microprocessor 3 having one or more processors and a memory, the memory having a plurality of prestored musical instrument sounds. An instrument switch 13 in communication with the microprocessor 3 such that the microprocessor may be configured to change musical instrument sounds within the plurality of prestored musical instrument sounds to a selected musical instrument sound when the instrument switch 3 is pressed. An electrically conductive string 1 stretched along the notch 115 on the top portion 120 of the housing 105 and configured for access by a user's finger. A electrical sensor 4 may be positioned in the housing 105 and in communication with the string 1 and microprocessor 3. The electrical sensor 4 may be configured to sense an intensity of current passing through the string 1 as a user's finger slides up and down the string. The microprocessor 3 may be further configured to adjust the pitch of the selected musical instrument sound to create a musical tone as a user's finger slides back and forth along the string stretched along the notch. The apparatus 100 further includes a trigger switch 7 in communication with the microprocessor 3 and accessible from an external area 125 of the housing. The trigger switch 7 when pressed stores the musical tone, to permit multiple musical tones to be stored one after another. A pickup 2 may be positioned in the housing and in communication with the string 1 and microprocessor 3. The pickup 2 may be configured to sense a vibration of the string when plucked by a user's finger, such that when the string is plucked multiple times corresponding to the multiple musical tones and plucked in a rhythm, the microprocessor 3 stores the rhythm with the multiple musical tones to create a sequence of musical notes. In addition, a bone conduction speaker 5 may be positioned in the housing 105 adjacent to a bone conduction surface 14 defined by the housing 105. The bone conduction speaker 5 may be in communication with the microprocessor and configured to play sounds generated by the apparatus as sound vibrations.

Instructions for microprocessor 3 may be programmed to playback the sequence of musical notes by an activation of the trigger switch 7. The apparatus may also include a rotary switch actuator 11 positioned within a circular bore 130 defined by the housing. The rotary switch actuator may be in communication with the microprocessor and includes multiple rotatable positions (11A, 11B, 11C), each position of the rotatable positions may be configured to access a corresponding electronic folder stored on the microprocessor for storing data, such as but not limited to previously saved sequence of musical notes.

Manual music generator 200 may use an electrically conductive surface 205 positioned along a portion 210 of the housing 105 and configured for access by a user's finger. The electrical sensor positioned in the housing may be in communication with the electrically conductive surface and microprocessor. The electrical sensor may be then configured to sense an intensity of current passing through the electrically conductive surface as a user's finger slides up and down the electrically conductive surface. The microprocessor being further configured to adjust the pitch of the selected musical instrument sound to create a musical tone as a user's finger slides back and forth along the electrically conductive surface. In manual music generator 200, the pickup may be in communication with the electrically conductive surface and microprocessor and configured to sense a vibration of the electrically conductive surface when the electrically conductive surface may be tapped by a user's finger. As such, when the electrically conductive surface may be tapped multiple times corresponding to the multiple musical tones and tapped in a rhythm, the microprocessor stores the rhythm with the multiple musical tones to create a sequence of musical notes.

The process of the manual music generator 100 may entail creating a sequence of musical notes without rhythm initially and then allowing the user to play back the same sequence via repetitively pressing one single button/actuation point, and the progressing through the notes after each press. The button/actuation point may also record velocity or how hard you press the button/actuation point with each press. As this occurs rhythm may be added to the sequence and may be recorded. Once the process is complete and a tune is recorded, the user can repeat the whole process again.

From the foregoing and as mentioned above, it will be observed that numerous variations and modifications may be affected without departing from the spirit and scope of the novel concept of the manual music generator. It is to be understood that no limitation with respect to the specific methods and apparatus illustrated herein is intended or inferred.

I claim:

1. A manual music generator apparatus comprising:

a housing configured for a manual manipulation by a user's hand, the housing having a body;

a microprocessor having one or more processors and a memory, the memory having one or more programs, and a plurality of prestored musical instrument sounds;

an instrument switch in communication with the microprocessor, the microprocessor being configured to change musical instrument sounds within the plurality of prestored musical instrument sounds to a selected musical instrument sound when the instrument switch is pressed;

an electrically conductive surface positioned along a portion of the housing and configured for access by a user's finger;

an electrical sensor positioned in the housing and in communication with the electrically conductive surface and microprocessor, the electrical sensor configured to sense an intensity of current passing through the electrically conductive surface as a user's finger slides up and down the electrically conductive surface, the programs being programmed to cause adjustment of a pitch of the selected musical instrument sound to create a musical tone as the user's finger slides up and down the electrically conductive surface;

a trigger switch in communication with the microprocessor and accessible from an external area of the housing, the trigger switch when pressed stores the musical tone, to permit multiple musical tones to be stored one after another;

a pickup positioned in the housing and in communication with the electrically conductive surface and microprocessor, the pickup configured to sense a vibration of the electrically conductive surface when the electrically conductive surface is tapped by a user's finger, such that when the electrically conductive surface is tapped multiple times corresponding to the multiple musical tones and tapped in a rhythm, the microprocessor stores the rhythm with the multiple musical tones to create a sequence of musical notes; and an audio delivery device in communication with the microprocessor and configured to play sounds generated by the apparatus.

2. The apparatus of claim 1, wherein the audio delivery device is a bone conduction speaker positioned in the housing adjacent to a bone conduction surface in communication with the microprocessor and configured to play sounds generated by the apparatus as sound vibrations.

3. The apparatus of claim 1, wherein the audio delivery device is a pair of headphones plugged into a headphone input that is in communication with the microprocessor.

4. The apparatus of claim 1, wherein the electrically conductive surface is an electrically conductive string stretched across a notch defined along a portion of the housing, and wherein the microprocessor is configured to detect a user's finger sliding across the electrically conductive string and further configured to detect a user's finger plucking the electrically conductive string.

5. The apparatus of claim 1, wherein the electrically conductive surface is a tactile surface positioned along a portion of the housing.

6. The apparatus of claim 1, wherein the microprocessor is configured to playback the sequence of musical notes by an activation of the trigger switch.

7. The apparatus of claim 1 further comprising a rotary switch actuator positioned within a circular bore defined by the housing, the rotary switch actuator in communication with the microprocessor having multiple rotatable positions, each position of the rotatable positions being configured to access a corresponding electronic folder stored on the microprocessor for storing data.

8. The apparatus of claim 7, wherein data stored in the corresponding electronic folder includes a previously saved sequence of musical notes.

9. The apparatus of claim 1 further comprising a rechargeable battery configured to supply power to the apparatus.

10. The apparatus of claim 1 further comprising a port access in communication with the microprocessor, the port access configured to provide power and data transfer.

11. A process of generating a sequence of music notes comprising:

selecting a musical instrument sound from a plurality of musical instrument sounds prestored in a memory from a microprocessor also having one or more processors;

providing an electrically conductive surface in communication with the microprocessor;

selecting a musical tone of the musical instrument sound by adjusting a pitch of the selected musical instrument sound from sliding a user's finger up and down the electrically conductive surface;

storing the musical tone on the memory;

repeatedly selecting and storing musical tones to create a plurality of musical tones stored one after each other on the memory;

replaying the multiple musical tones one at a time by actuating the electrically conductive surface; and sensing an intensity of vibration against the electrically conductive surface during the actuation of the electrically conductive surface as a rhythm and storing the rhythm with the multiple musical tones to create a sequence of musical notes.

12. The process of claim 11, wherein the electrically conductive surface is an electrically conductive string, configured to detect a user's finger sliding across the electrically conductive string and further configured to detect a user's finger plucking the electrically conductive string.

13. The process of claim 11 further comprising providing a bone conduction speaker in communication with the microprocessor and configured to play sounds as sound vibrations.

14. The process of claim 11, wherein the electrically conductive surface is a tactile surface.

15. An apparatus configured to generate musical sequences based on tactile inputs, the apparatus comprising:

a housing configured to be held by a user's hand;

a microprocessor having one or more processors;

a memory having a plurality of prestored musical instrument sounds;

a first switch in communication with the microprocessor and when pressed configured to change musical instrument sounds, within the plurality of prestored musical instrument sounds;

an electrically conductive surface positioned along a portion of the housing and configured for tactile manipulation by a user's finger;

an electrical sensor positioned within the housing and in communication with the electrically conductive surface and microprocessor, the electrical sensor configured to sense an intensity of current passing through the electrically conductive surface when a user's finger moves in one or more directions across the electrically conductive surface, and the microprocessor being further configured to adjust a pitch of the selected musical instrument sound in response to the intensity of current sensed by the electrical sensor to create a musical tone;

a second switch in communication with the microprocessor, the second switch when pressed stores the musical tone, to permit multiple musical tones to be stored in precession of each other;

a pickup positioned in the housing and in communication with the electrically conductive surface and microprocessor, the pickup configured to sense a vibration of the electrically conductive surface when tapped by a user's finger, such that when the electrically conductive surface is tapped multiple times corresponding to the multiple musical tones and tapped in a rhythm, the microprocessor adds the rhythm to the multiple musical tones to create a sequence of musical notes; and an audio delivery device in communication with the microprocessor and configured to play sounds generated by the apparatus.

16. The apparatus of claim 15, wherein the audio delivery device is a bone conduction speaker positioned in the housing adjacent to a bone conduction surface in communication with the microprocessor and configured to play sounds generated by the apparatus as sound vibrations.

17. The apparatus of claim 15, wherein the audio delivery device is a pair of headphones plugged into a headphone input that is in communication with the microprocessor.

18. The apparatus of claim 15, wherein the microprocessor is configured to playback the sequence of musical notes by an activation of the second switch.

19. The apparatus of claim 15 further comprising a rotary switch actuator positioned within a circular bore defined by the housing, the rotary switch actuator in communication with the microprocessor having multiple rotatable positions, each position of the rotatable positions being configured to access a corresponding electronic folder stored on the microprocessor for storing data.

20. The apparatus of claim 15, wherein the electrically conductive surface is an electrically conductive string stretched across a notch defined along a portion of the housing, configured to detect a user's finger sliding across the electrically conductive string and further configured to detect a user's finger plucking the electrically conductive string.

* * * * *